United States Patent [19]

Yamada

[11] Patent Number: 4,957,589
[45] Date of Patent: Sep. 18, 1990

[54] PROCESS FOR PRODUCING SECOND HARMONIC WAVE GENERATING DEVICE

[75] Inventor: Masaya Yamada, Ogaki, Japan

[73] Assignee: Ibiden Co., Ltd., Gifu, Japan

[21] Appl. No.: 381,407

[22] PCT Filed: Nov. 30, 1988

[86] PCT No.: PCT/JP88/01214
§ 371 Date: Jul. 10, 1989
§ 102(e) Date: Jul. 10, 1989

[87] PCT Pub. No.: WO89/05473
PCT Pub. Date: Jun. 15, 1989

[30] Foreign Application Priority Data

Nov. 30, 1987 [JP] Japan .................. 62-299831

[51] Int. Cl.$^5$ .......................... B44C 1/22; C23F 1/02; C03C 15/00; C03C 25/06
[52] U.S. Cl. .................. 156/643; 156/645; 156/656; 156/659.1
[58] Field of Search ............... 156/643, 645, 646, 655, 156/656, 659.1, 662; 219/121.85; 427/53.1; 350/96.11, 96.12; 357/17, 19, 30

[56] References Cited

FOREIGN PATENT DOCUMENTS 58-48006  3/1983  Japan.
0123524   7/1983  Japan.
0250334  12/1985  Japan.

Primary Examiner—William A. Powell
Attorney, Agent, or Firm—Frishauf, Holtz, Goodman & Woodward

[57] ABSTRACT

A process for producing a second harmonic wave generating device which converts the wavelength of the incident laser beam to ½ wavelength thereof by utilizing the non-linear optical effect possessed by an optical crystal. In forming a light waveguide according to the angle phase-matching method, the desired light waveguide is formed by generating practically the second harmonic wave and therefore phase matching can be effected very easily, and also its matching precision is higher, whereby a second harmonic wave generating device with excellent SHG conversion efficiency can be produced.

11 Claims, 4 Drawing Sheets

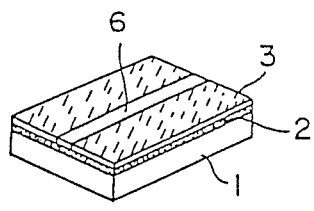
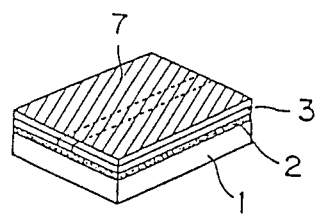
FIG. 2(a)　　　　　FIG. 2(b)
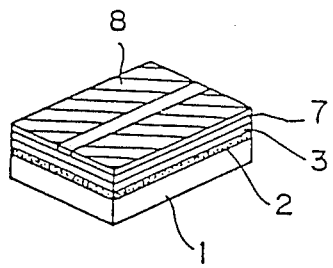
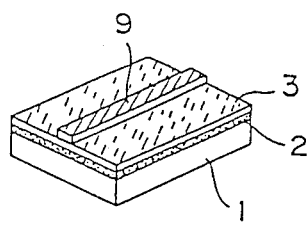
FIG. 2(c)　　　　　FIG. 2(d)
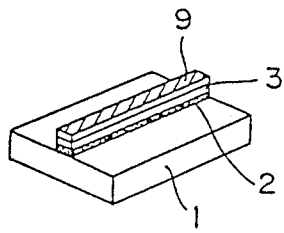
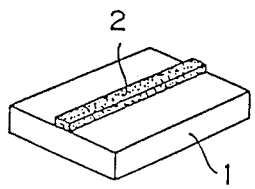
FIG. 2(e)　　　　　FIG. 2(f)

PROCESS FOR PRODUCING SECOND HARMONIC WAVE GENERATING DEVICE

BACKGROUND OF THE INVENTION

This invention relates to a process for producing a second harmonic wave generating device which converts the wavelength of an incident laser beam to ½ of its wavelength by utilizing the non-linear optical effect possessed by an optical crystal, and more particularly to a process for producing a second harmonic wave generating device which can effect phase matching easily and also with extremely high precision during formation of a light waveguide according to the angle matching method.

A second harmonic generation (SHG) device, for example, can be applied to an optical disc memory, CD player, etc. since an output light wavelength becomes ½ and thus the recording density can be made to be 4-fold, can be applied to a laser printer, etc. for which acceleration of speed is demanded since light-sensitive sensitivity can be improved through shortening of the wavelength, and can be applied to photolithography, etc. since fine pattern working becomes possible by shortening of the wavelength, and therefore its application fields are very wide.

For such SHG device, heretofore, a bulk single crystal of a non-linear optical crystal with the use of a high power gas laser as the light source has been used. However, in recent years, a semiconductor laser is becoming to be mainly utilized in place of a gas laser for such reasons that (1) there is a strong demand to miniaturize the device as a whole such as an optical disc device, laser printer, etc., (2) while a gas laser requires an external modulator for optical modulation, a semiconductor can be directly modulated, (3) a semiconductor laser is less expensive and easier in handling as compared with a gas laser, etc. Accordingly, it has become necessary to have a device which can obtain high SHG output even by use of a semiconductor laser light source having low output power.

Thus, for obtaining a device having high SHG output with low light source power, it is necessary to confine the laser beam within a narrow region with a light waveguide to make the light power density higher, thereby enhancing the SHG transducing efficiency, simultaneously with effecting phase matching between the incident laser beam and the second harmonic wave.

More specifically, in order to obtain high SHG output, for preventing the second harmonic wave generated and the polarized wave induced through the non-linear optical effect from the fundamental wavelength light from being mutually weakened to be attenuated, it is necessary to make the phase velocity of the both coincident with each other. This corresponds to coincidence of the refractive index of a crystal relative to the fundamental wavelength light with the refractive index relative to the second harmonic wave. However, generally speaking, due to the wavelength dispersion possessed by a crystalline material, the refractive index will vary with wavelength, whereby this demand cannot be satisfied. Accordingly, it becomes necessary to make the refractive indices relative to the two wavelengths by way of some method.

As such method, there the angle phase-matching method and the temperature phase-matching method. The former utilized birefringence of an optical material as shown in FIG. 4, which is a method in which a light with a wavelength of $\lambda$ is permitted to enter in the direction making an angle $\theta$ relative to the crystal axis in FIG. 4 so that the refractive indices of the light with the wavelength $\lambda$ and the light with the wavelength $\lambda/2$ may be equal to each other. The latter utilizes the change of the refractive index of an optical material with temperature, which is a method in which the refractive indices of the wavelength $\lambda$ and the light with the wavelength $\lambda/2$ are made identical.

However, when phase matching based on the angle matching method as described above is performed, precision capable of controlling the angle at about $\pm 0.1°$ is generally required. For this reason, in a slab type light waveguide having a light waveguide formed on the whole substrate surface, the device can be previously cut so that the above angle $\theta$ may be substantially perpendicular to the incident surface, and subsequently the incident angle of the incident light can be finely controlled to effect phase matching easily. However, in a channel type light waveguide, during preparation of the light waveguide, the light waveguide must be prepared with a precision of about $\pm 0.1°$, whereby there has been involved that an extremely difficult technique is demanded and also a manufacturing device with high precision is required.

On the other hand, when phase matching is effected by use of the temperature matching method, for making a device with high SHG output, the temperature must be controlled at about $\pm 0.1°$ C., whereby it is not practical since a special device has been required in use of the device.

The present invention has been accomplished in order to solve the above problems, and its object is to provide a process for producing a second harmonic wave generating device which can effect phase matching based on the angle matching method easily and at extremely high precision.

DISCLOSURE OF THE INVENTION

The process for producing a second harmonic wave generating device according to the first invention is characterized by having the step of coating a visible light light-sensitive material on a light waveguide of an optical circuit device having a slab type light waveguide comprising an optical crystal; the step of allowing incidence of a laser beam into said light waveguide with the end surfaces on the sides of incidence and exit of light being polished to effect phase matching and simultaneously exposing said visible light light-sensitive material with the visible light second harmonic wave generated; the step of developing said visible light light-sensitive material for etching mask; the step of patterning the light waveguide for the second harmonic wave by etching treatment of said light waveguide surface; and the step of removing said visible light light-sensitive material for etching.

On the other hand, the process for producing a second harmonic wave generating device according to the present invention is characterized by having the step of coating a visible light light-sensitive material on a light waveguide of an optical circuit device having a slab type light waveguide comprising an optical crystal; the step of allowing incidence of a laser beam into said light waveguide with the end surfaces on the sides of incidence and exit of light being polished to effect phase matching and simultaneously exposing said visible light light-sensitive material with the visible light second harmonic wave generated; the step of developing said visible light light-sensitive material to discolor the light-sensitive portion; the step of coating a resist on said visible light light-sensitive material; the step of contacting a photomask for lightwave pattern having a predetermined dimensional pattern on said resist so as to correspond to said light-sensitive portion and effecting exposure and developing treatments to obtain an etching mask; the step of patterning the light waveguide for the second harmonic wave by etching treatment of said visible light light-sensitive material and light waveguide surface; and the step of removing said visible light light-sensitive material and etching mask.

The present invention comprises forming an etching mask on the surface of a slab type waveguide in conformity with the light waveguide for the second harmonic wave generated by angle phase matching which adjusts finely the incident angle onto the slab type waveguide and subjecting the portion except for the etching mask to etching treatment, thereby forming a channel type light waveguide.

The visible light light-sensitive material to be used in the step of coating of a visible light light-sensitive material on the slab type waveguide must have the function of a light-sensitive material having excellent sensitivity to the second harmonic wave generated. The coated thickness of such light-sensitive material may be 0.1 to 100 μm, more preferably 0.5 to 10 μm, particularly preferably 1 to 3 μm.

The light-sensitive material to be used in the first invention must have the function as the resist during etching treatment in addition to the above function.

Further, the optical crystal for light waveguide is not particularly limited, provided that it is an optically anisotropic material having the non-linear optical effect, including, for example, inorganic non-linear optical crystals such as $LiNbO_3$ having Ti thermally diffused therein, proton-exchanged $LiNbO_3$, $LiNbO_3$ forming solid solution with MgO, $LiTaO_3$, $KTiOPO_4$, $KNbO_3$, $\beta\text{-}BaB_2O_4$, $Ba_2NaNb_5O_{15}$, $Ba_2LiNb_5O_{15}$, $K_3Li_2Nb_5O_{15}$, $\alpha$-quartz, $KH_2PO_4$, $KD_2PO_4$, $NH_4H_2PO_4$, $CsH_2AsO_4$, $CsD_2AsO_4$, $RbH_2PO_4$, $RbH_2AsO_4$, $BeSO_4\text{-}4H_2O$, $LiClO_4\text{-}3H_2O$, $LiIO_3$, etc.; organic non-linear optical materials such as 2-methyl-4-nitroaniline, urea, methyl-(2,4-dinitro-phenyl)-aminopropanate, L-arginine-phosphate monohydrate (LAP), etc.

Phase matching in the step of exposing the visible light light-sensitive material simultaneously with phase matching of a laser beam is performed by placing an optical circuit device on a sample stage, etc. and effecting fine adjustment of the incident angle of the laser beam which becomes a second harmonic wave generating light source. When the incident angle becomes that at which the refractive index of the laser beam is coincident with the refractive index of the second harmonic wave to be generated, the second harmonic wave with half wavelength of the incident laser beam is outputted. And, while the second harmonic wave propagates linearly through the slab type light waveguide, the scattered light generated along its route is leaked from the upper part of the device. Exposure of the light-sensitive material along the light waveguide is effected. Accordingly, the light waveguide for the second harmonic wave generated by phase matching can be reproduced exactly as the light waveguide.

As the laser beam to be used in the step as described above, a semiconductor laser is used, and its wavelength may be suitably selected depending on the wavelength of the desired second harmonic wave. Polishing of the incident and exit side end surfaces is done for the purpose of enhancing the power density of the incident laser beam or the second harmonic wave exited by preventing irregular reflection at the end surfaces. As such end surface polishing method, there are buff polishing by use of alumina abrasive particles, the method by use of lapping plate, the method by use of lapping film, etc.

As the etching method to be used in the step of patterning the light waveguide for the second harmonic wave, high precision is required for the etching treatment, because such etching treatment affects directly the light waveguide dimension and is important in exhibiting high power density by preventing optical loss through scattering of the laser beam within the light waveguide. As the method conforming to such requirement, there may be included such methods as ion beam etching, reactive ion etching, plasma etching, laser etching, etc.

In the step of obtaining an etching mask in the second invention, when a positive-type resist is coated, after a photomask is contacted, exposure and developing processing can be effected to form a resist pattern which becomes the etching mask. In the case of coating of a negative-type resist, after exposure and developing processing are effected with a photomask being in contact, a metal film is vapor deposited thereon by way of sputtering, etc., and further said resist and the metal film on said resist are removed with a solvent, whereby a pattern which becomes the etching mask can be formed.

During patterning of the light waveguide for the second harmonic wave, it is preferred to employ the etching method as described above, but it is also possible to effect patterning of the light waveguide by laser working or mechanical working with the light-sensitive pattern of the visible light light-sensitive material being as the target.

Further, patterning of the light waveguide may be also possible by effecting etching treatment by coating a resist on the light waveguide similarly as in the second invention while observing the scattered pattern of the laser beam with eyes without coating of the visible light light-sensitive material, and also patterning of the light waveguide may be possible by laser working or mechanical working while observing the scattered pattern of the laser beam with eyes.

BRIEF DESCRIPTION OF THE DRAWINGS

FIGS. 2(a)–2(f) and 3(a)–3(h) are diagrams illustrating the steps for producing the second harmonic wave generating device according to the second embodiment of the invention, FIGS. 2(a)–2(f) showing the case when a positive-type resist is employed and FIGS. 3(a)–3(h) the case when a negative-type resist is employed.

DETAILED DESCRIPTION

[BEST MODE FOR PRACTICING THE INVENTION]

In the following, Examples of the present invention are described in detail by referring to the accompanying drawing.

EXAMPLE 1

Figure 1A:
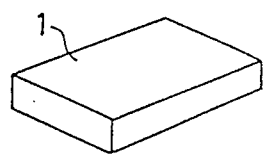
FIGS. 1(a)–1(f) are diagrams illustrating the steps for producing the second harmonic wave generating device according to the first embodiment of the invention.
Figure 1B:
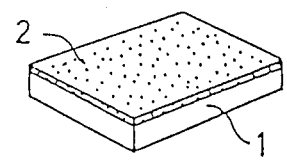

A Ti thin film formed on an X cut LiNbO$_3$ single crystal substrate 1 with a thickness of 0.5 mm (FIG. 1(a)) was thermally diffused to prepare an optical circuit device having a slab type light waveguide comprising LiNbO$_3$ having diffused Ti therein (FIG. 1(b)). That is, on the above substrate 1, a Ti thin film with a thickness of 400 A was formed according to the high frequency (RF) sputtering method, and the Ti thin film was thermally diffused in a humidified Ar gas stream at 1000° C. for 5 hours and further in a humidified O$_2$ gas stream at 1000° C. for one hour to form a light waveguide 2.

Figure 1C:
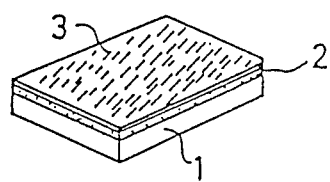

On the light waveguide 2 of the above optical circuit device, a visible light light-sensitive photoresist was coated to a thickness of 2 µm as the visible light light-sensitive material 3 (FIG. 1(c)).

Figure 1D:
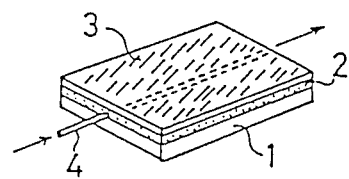

After mirror polishing of the light incident and exit side end surfaces of the optical circuit device by vibrating buff polishing, it was placed on a sample stage which was made horizontally rotatable around the vertical axis, and a He-Ne laser beam 4 with a wavelength of 1.15 µm was permitted to be incident into the light waveguide 2. And, phase matching was effected by rotating the above sample stand a fine angle (FIG. 1(d)). By such phase matching, the second harmonic wave with a wavelength of 0.575 µm was generated and the light-sensitive material 3 coated on the surface of the light waveguide 2 was exposed to the same pattern as the second harmonic wave by the scattered light generated during the propagation of the second harmonic wave through the light waveguide 2.

Figure 1E:
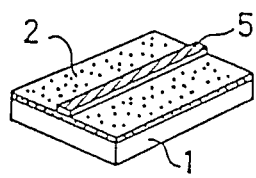

Subsequently, the light-sensitive material 3 was developed to provide an etching mask 5 corresponding to the route of the second harmonic wave (FIG. 1(e)).

The step of coating the visible light light-sensitive material 3 on the light waveguide 2 to the step of developing the light-sensitive material 3 were worked in a dark room or red safe light to which the light-sensitive material 3 was not sensitive.

Figure 1F:
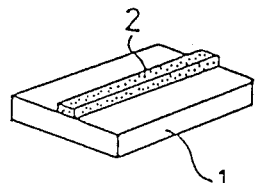

Next, an etching treatment was applied on the above light waveguide 2 by ion beam etching to effect etching of the portion other than the etching mask 5. And, the etching mask 5 was removed from the optical circuit device to prepare a SHG device as shown in FIG. 1(f).

When the SHG conversion efficiency of the SHG device was measured, when a He-Ne laser with a wavelength of 1.15 µm and 1 mW was used as the light source, it was found to be $1 \times 10^{-4}$, which was higher as compared with the device of the prior art having an efficiency of $2 \times 10^{-5}$.

EXAMPLE 2

First, an optical circuit device having the light waveguide 2 formed on the substrate 1 was prepared in the same manner as in Example 1.

Subsequently, a photographic light-sensitive emulsion (Liquid light) was coated on the light waveguide 2 to a thickness of 0.5 µm as the visible light light-sensitive material 3.

And, after the light incident and exit side end surfaces were mirror worked similarly as in Example 1, a He-Ne laser beam 4 with a wavelength of 1.15 µm wa permitted to be incident into the light waveguide 2 to effect phase matching. With such phase matching, the second harmonic wave with a wavelength of 0.575 µm was generated, and the lightsensitive material 3 was exposed to the same pattern as the route of the second harmonic wave generated.

Subsequently, the light-sensitive material 3 was developed to discolor the light-sensitive portion 6 corresponding to the rote of the second harmonic wave (FIG. 2(a)).

On the light-sensitive material 3, a positive-type photoresist 7 was coated by a spin coater (FIG. 2(b)). The rotational number of the spin coater was 1800 rpm, and the coating film thickness was 2 µm.

And, the photographic sensitive plate photomask 8 applied with a linear pattern with a width of 10 µm was contacted on the resist 7 by mask aligning with the use of a mask aligner so as to corresponding to the light-sensitive portion 6 of the above light-sensitive material 3 seen through the photo-resist 7 (FIG. 2(c)), and the resist 7 was exposed with UV-ray and developed to obtain a resist pattern for the etching mask 9 (FIG. 2(d)). The etching mask 9 was found to have a width of 10 µm and a thickness of 2 µm.

Subsequently, ion beam etching (acceleration voltage 2 kV, ion current density 0.9 mA/cm$^2$) was applied on the light waveguide 2 and the light-sensitive material 3 to etch the portion other than the etching mask 9 to obtain a channel type waveguide 2 with a width of 10 µm and a thickness of 2 µm (FIG. 2(e)). Finally, the light-sensitive material 3 and the etching mask 9 were removed with a solvent (FIG. 2(f)).

When the conversion efficiency of the SHG device obtained was measured, when a He-Ne laser with a wavelength of 1.152 µm and 5 mW was used as the light source, it was found to be $4 \times 10^{-4}$, which was higher as compared with the device of the prior art having an efficiency of $2 \times 10^{-5}$.

EXAMPLE 3

Figure 3A:
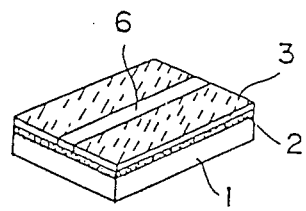
Figure 3B:
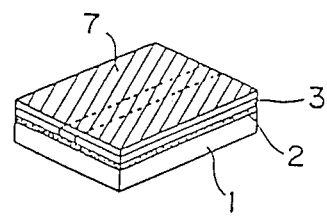

The steps before resist coating were the same as in Example 2, but a negative-type photoresist 7 was coated on the light-sensitive material 3 by a spin coater (FIG. 3(a), (b)). The rotational number of the spin coater was 3600 rpm, and the coating film thickness was 1 µm.

Figure 3C:
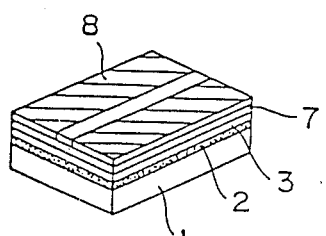
Figure 3D:
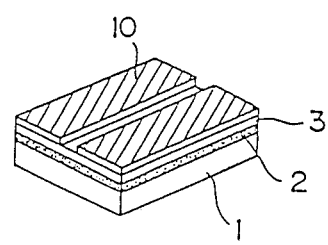

Subsequently, mask alignment was effected in the same manner as in Example 2 (FIG. 3(c)), followed by exposure and developing, to obtain a resist pattern 10 (FIG. 3(d)).

Figure 3E:
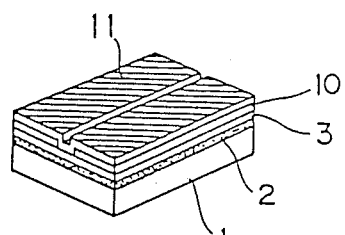
Figure 3F:
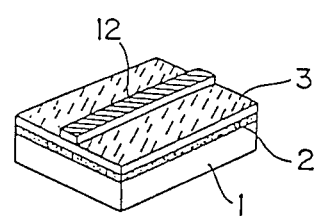

Next, a Ti film 11 was formed to a thickness of 1 µm by RF sputtering (FIG. 3(e)). And, according to the lift-off method in which the resist pattern 10 and the Ti film 11 on said resist pattern 10 were removed with a solvent, a Ti pattern for the etching mask 12 with a width of 10 µm was obtained.

Figure 3G:
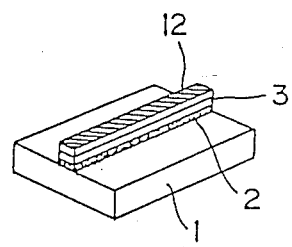
Figure 3H:
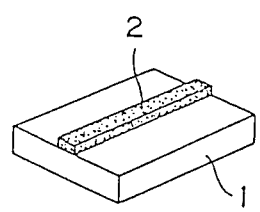
Figure 4:
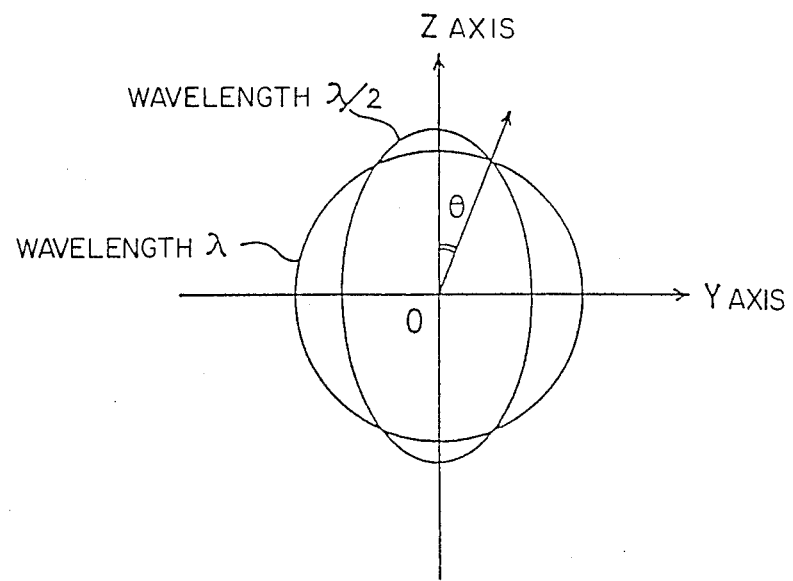
FIG. 4 is a refractive index distribution diagram showing the method of phase matching.

And, ion beam etching (acceleration voltage 2 kV, current density 0.9 mA/cm$^2$) was applied on the light waveguide 2 and the light-sensitive material 3 for 3 hours to etch the portion other than the etching mask 12, thereby obtaining a channel type waveguide 2 with a width of 10 µm and a thickness of 2 µm (FIG. 3(g)). Finally, the light-sensitive material 3 and the etching mask 12 were removed with a solvent (FIG. 3(h)).

When the conversion efficiency of the SHG device obtained was measured, when a He-Ne laser with a wavelength of 1.152 µm and 5 mW was used as the light source, it was found to be $4 \times 10^{-4}$, which was higher as compared with the device of the prior art having an efficiency of $2 \times 10^{-5}$.

EXAMPLE 4

The steps to mirror finishing of the light incident and exit side end surfaces were the same as in Example 2, but as the laser beam source, a semiconductor laser beam with a wavelength of 0.83 μm was permitted to enter the light waveguide as a parallel light by a lens to effect phase matching. By such phase matching, the second harmonic wave with a wavelength of 0.415 μm was generated, and the light-sensitive material 3 was exposed to the same pattern as the route of the second harmonic wave generated. Subsequently, the same steps as in Example 2 were conducted, and the conversion efficiently of the SHG device obtained was measured. As the result, when a semiconductor laser with a wavelength of 0.83 μm and 30 mW was used as the light source, it was found to be $1 \times 10^{-2}$, which was higher as compared with the device of the prior art having an efficiency of $1 \times 10^{-3}$.

EXAMPLE 5

The steps were the same as in Example 1, but as the visible light light-sensitive material 3, a conventional photoresist for UV-ray exposure having a light-sensitive region up to a wavelength of about 0.4 μm was used and a semiconductor laser with a wavelength of 0.83 μm as the laser light source to prepare a SHG device. In this case, since the photo-resist is not sensitive to a wavelength of 0.5 μm or higher, and therefore the all steps were conducted under conventional yellow safe light without use of a dark room or red safe light.

When the conversion efficiency of the SHG device obtained was measured, when a semiconductor laser with a wavelength of 0.83 μm and 30 mW was used as the light source, it was found to be $2 \times 10^{-2}$, which was higher as compared with the device of the prior art having an efficiency of $1 \times 10^{-3}$.

The present invention, as described above, forms the desired light waveguide by practically generating the second harmonic wave and therefore is extremely easy in phase matching, and also high in its matching precision, whereby a second harmonic wave generating device excellent in SHG conversion efficiency can be produced.

I claim:

1. A process for producing a second harmonic wave generating device, comprising:
   providing a slab-type light waveguide of an optical circuit device, said slab-type light waveguide comprising an optical crystal, said light waveguide having light incident and light exit end surfaces, said end surfaces being polished;
   coating a visible light light-sensitive material on said slab-type light waveguide;
   permitting a laser beam to be incident on said polished light incident end surface of said light waveguide, and allowing exiting of the light at said polished light exit end surface to effect phase matching, and simultaneously exposing said visible light light-sensitive material with a visible light second harmonic wave which is generated as a result of said phase matching;
   developing said visible light light-sensitive material for producing an etching mask;
   patterning the light waveguide for the second harmonic wave by an etching treatment of said light waveguide surface using said etching mask; and
   removing said visible light light-sensitive material at portions not corresponding to said etching mask, and then removing said etching mask from said light waveguide surface.

2. The process of claim 1, wherein the etching mask produced during said developing step corresponds to the route of the second harmonic wave.

3. A process for producing a second harmonic wave generating device, comprising:
   providing a slab-type light waveguide of an optical circuit device, said slab-type light waveguide comprising an optical crystal, said light waveguide having light incident and light exit end surfaces, said end surfaces being polished;
   coating a visible light light-sensitive material on said slab-type light waveguide;
   permitting a laser beam to be incident on said polished light incident end surface of said light waveguide, and allowing exiting of the light at said polished light exit end surface to effect phase matching, and simultaneously exposing said visible light light-sensitive material with a visible light second harmonic wave which is generated as a result of said phase matching;
   developing said visible light light-sensitive material to discolor the light-sensitive portion;
   coating a resist on said visible light light-sensitive material;
   contacting a photomask for a lightwave pattern having a predetermined dimensional pattern on said resist so as to correspond to said light-sensitive portion, and effecting exposure and developing treatments to obtain an etching mask;
   patterning the light waveguide for the second harmonic wave by an etching treatment of said visible light light-sensitive material and said light waveguide surface; and
   removing said visible light light-sensitive material at portions not corresponding to said etching mask, and removing said etching mask from said light waveguide surface.

4. The process of claim 3, wherein the light sensitive portion corresponding to the route of the second harmonic wave is discolored in said developing step.

5. The process of claim 3, wherein said removing is carried out using a solvent.

6. The process of claim 3, wherein the step of coating said resist comprises coating a positive-type photo-resist on said visible light light-sensitive material.

7. The process of claim 6, wherein said resist is coated using a spin coater.

8. The process of claim 3, wherein the step of coating said resist comprises coating a negative-type photo-resist on said visible light light-sensitive material; and further comprising the steps of:
   coating a Ti film on the surface containing the etching mask prior to said patterning step;
   then selectively removing the Ti film and the resist coating to form a Ti pattern for an etching mask.

9. The process of claim 8, wherein the light sensitive portion corresponding to the route of the second harmonic wave is discolored in said developing step.

10. The process of claim 8, wherein said removing is carried out using a solvent.

11. The process of claim 8, wherein said resist is coated using a spin coater.

* * * * *